US012698180B2

(12) United States Patent
Rebiere et al.

(10) Patent No.: US 12,698,180 B2
(45) Date of Patent: Aug. 4, 2026

(54) ELECTRICAL EQUIPMENT MOUNTING BASE PLATE WITH CABLE STORAGE RECESS

(71) Applicant: LATELEC, Toulouse (FR)

(72) Inventors: Yoann Rebiere, Ramonville Occitane (FR); Julien Mourieras, Toulouse (FR)

(73) Assignee: LATELEC, Toulouse (FR)

( * ) Notice: Subject to any disclaimer, the term of this patent is extended or adjusted under 35 U.S.C. 154(b) by 626 days.

(21) Appl. No.: 18/249,400

(22) PCT Filed: Oct. 18, 2021

(86) PCT No.: PCT/EP2021/078857
§ 371 (c)(1),
(2) Date: Apr. 18, 2023

(87) PCT Pub. No.: WO2022/084268
PCT Pub. Date: Apr. 28, 2022

(65) Prior Publication Data
US 2023/0391581 A1 Dec. 7, 2023

(30) Foreign Application Priority Data
Oct. 20, 2020 (FR) ..................................... 2010733

(51) Int. Cl.
*B65H 75/36* (2006.01)
*B64D 47/00* (2006.01)
*H02G 3/08* (2006.01)
(52) U.S. Cl.
CPC .......... *B65H 75/364* (2013.01); *B64D 47/00* (2013.01); *H02G 3/081* (2013.01); *B64D 2221/00* (2013.01); *B65H 2701/34* (2013.01)

(58) Field of Classification Search
CPC .. B65H 75/364; B65H 2701/34; B64D 47/00; H02G 3/081
See application file for complete search history.

(56) References Cited

U.S. PATENT DOCUMENTS

| | | | |
|---|---|---|---|
| 3,792,189 A | 2/1974 | Grassl | |
| 2004/0149533 A1 | 8/2004 | Milano | |
| 2009/0084882 A1* | 4/2009 | Williams | B65D 85/04 |
| | | | 242/360 |
| 2010/0314505 A1 | 12/2010 | Deimer | |

FOREIGN PATENT DOCUMENTS

| | | | |
|---|---|---|---|
| WO | WO2005094290 | 10/2005 | |
| WO | WO-2005094290 A2 * | 10/2005 | H02G 11/02 |
| WO | WO2012158426 | 11/2012 | |

* cited by examiner

*Primary Examiner* — Robert J McCarry, Jr.
(74) *Attorney, Agent, or Firm* — Defillo & Associates, Inc; Evelyn A. Defillo

(57) ABSTRACT

Aeronautical electrical equipment item fixing baseplate (1) having: a spacer including first attachment device defining a fixing base (3) on a support, and second attachment device defining a support face (4) suitable for holding an electrical equipment item; a storage recess (11), disposed between the fixing base (3) and the support face (4) of the spacer, and having a first lateral opening (13); cable ties (10), disposed in the storage recess (11), and suitable for holding a cable winding; a connector support (7), disposed opposite the first lateral opening (13) of the storage recess (11), and provided with a connector locking device.

14 Claims, 5 Drawing Sheets

ELECTRICAL EQUIPMENT MOUNTING BASE PLATE WITH CABLE STORAGE RECESS

CROSS REFERENCE TO RELATED APPLICATION

This application is a national stage entry of PCT/EP2021/078857 filed Oct. 18, 2021, under the International Convention claiming priority over French Patent Application No. 2010733 filed Oct. 20, 2020.

TECHNICAL FIELD

The invention relates to the disposition and the connection of electrical equipment housings within complex structures such as aircraft.

In the aeronautical field, for example, the mounting and the connection of the various onboard electrical networks implement electromechanical housings forming an embedded electrical power supply and data transport infrastructure.

The electromechanical housings of this type are generally called "electrical equipment items" since they are equipped with at least one interface connector and they ensure the protection of the electronic circuits that they contain, such as electrical power supply or signal process circuits.

These equipment items must regularly be mounted or dismounted during aircraft assembly, aircraft reconditioning or simple maintenance phases. Such equipment items are also likely to be incorporated in an existing installation.

When an aircraft is being assembled, or during an operation of installation or removal of all or part of the network, the wired interconnection links are first of all mounted on the structure of the aircraft. A check on the conformity of the addressing of the interconnected links is then carried out to ensure the coherence and operational safety of the onboard network once powered up. Only after this check are the electrical equipment items then put in place and connected to the wired interconnection network.

PRIOR ART

The electrical infrastructure of an aircraft, notably the dimensioning and the positioning of the wired interconnection links and of the electrical equipment items, is determined and set at the time of design of the aircraft in the design office.

The positioning of the electrical equipment items and of the wired interconnection links determines the necessary cable lengths and the paths of these cables within the aircraft.

SUMMARY OF THE INVENTION

The aim of the invention is to improve the arrangement of the interconnection devices of the prior art.

To this end, the invention targets an aeronautical electrical equipment item fixing baseplate comprising:

a spacer comprising first attachment device defining a fixing base, and second attachment device defining a support face for holding the electrical equipment items;

a storage recess, disposed between the fixing base and the support face of the spacer, and comprising a first lateral opening;

cable ties, disposed in the storage recess, and suitable for holding a cable winding;

a connector support, disposed opposite the first lateral opening of the storage recess, and provided with a connector locking device.

According to another object, the invention targets an aircraft comprising a wired interconnection network and electrical equipment items connected to this network. In this aircraft, at least one electrical equipment item is mounted on a fixing baseplate as described above, this electrical equipment item being connected to the wired interconnection network by a cable, a portion of which is coiled in the storage recess.

According to another object, the invention targets a method for configuring the physical architecture of the wired interconnection network of an aircraft, comprising the following steps:

mounting, on a structure of the aircraft, at least one fixing baseplate as described above;

installing a cable of the wired interconnection network, a portion of which is coiled in the storage recess of the fixing baseplate, and locking a connector onto the connector support of the fixing baseplate;

checking conformity of the wired interconnection network;

mounting an electrical equipment item on the fixing baseplate and connecting the connector to the electrical equipment item.

According to a preferred feature, the method further comprises, before the step of mounting an electrical equipment item on the fixing baseplate, a step of transporting the aircraft structure.

According to another preferred feature, the method further comprises an operation of moving the electrical equipment item comprising the following steps:

removing the electrical equipment item from the fixing baseplate;

moving the fixing baseplate within the aircraft structure by modifying the cable winding situated in the storage recess;

replacing the electrical equipment item on the fixing baseplate.

The fixing baseplate, the aircraft and the method according to the invention allow a modulable configuration of the equipment items and of the wired interconnection links. Each electrical equipment item can have, in its fixing baseplate, a surplus length of its connecting cable, coiled safely and held in the cable ties.

Such a modulable architecture offers a capacity to adapt the wired interconnection links lengthwise. This capacity for adaptation is useful in mounting and rework operations, as well as in architecture reconfiguration operations. For example, for the electrical installations for distributing passenger entertainment data, present in recent aircraft (audio, video, etc.), equipment items can be relocated within the aircraft cabin following a reconfiguration of the arrangement of the cabin (modification of the number or the position of the seats, etc.).

The wired interconnection links can thus be shortened or lengthened by virtue of the possibility of stowing away or providing additional cable length by virtue of the cable windings present in the storage recess of the equipment fixing baseplates.

This possible adaptation of the wired interconnection link lengths and of the position of the electrical equipment items is performed, while maintaining the level of order and of safety demanded by the aeronautical applications. The routing of the cables is ordered and their apparent length is exactly that necessary for the connection, without additional lengths that are a nuisance and exposed to degradation.

When an aircraft is being assembled, or when a wired architecture is being reconfigured, the fixing baseplate makes it possible to render the electrical equipment item independent, temporarily, of the wired interconnection links that affect it. In fact, when an aircraft is being assembled, initially, all the wired interconnection links can be put in place within the aircraft, as can the fixing baseplates each receiving the corresponding connector. The interconnection members are thus held safely, although the electrical equipment housings are not in place. Such a configuration makes it possible to proceed, only subsequently, and notably after the conformity checks, with the mounting of the electrical equipment items.

These possibilities are particularly relevant in the context of the logistics chains used in aeronautics, where various aircraft portions are produced on different production sites, then are transported by boat or cargo airplane to a final production site where assembly takes place. The invention thus makes it possible to deliver an aircraft structure with its wired interconnection links and its fixing baseplates put in place safely, without any excess length or free connector. These elements are thus protected from any damage resulting in particular from transportation.

In the case of a wired architecture reconfiguration, the wired interconnection links can be modified both with respect to their routing and their length. Some links can be lengthened and others can be shortened without the risk of damage to the cables or connectors. The electrical equipment items are then replaced on the fixing baseplates only when the reconfiguration is finished.

These possibilities are advantageous in light of the trend to complexification that is observed in the life cycle of aircraft. For airliners, for example, the latter are now frequently resold between airlines, or assigned to different uses during their service, and the possibilities of reconfiguration of the wired architecture allow great savings compared to the methods of the prior art consisting, during such reconfiguration, in dismounting all of the wired network concerned, and directly replacing it. These reconfiguration possibilities can be provided from the design of a series aircraft, to guarantee a low cost to any reconfigurations that it will undergo during its life cycle, while keeping the requisite safety level.

The invention also makes it possible to use, in the wired interconnection links, cables which have a predefined length that cannot be modified. For example, some cables are terminated by connectors that are difficult to fix and that require restrictive hardware, making them difficult and costly to cut to the right length and for the appropriate connector to be fitted on the production site. According to another example, some cables, of sensors in particular, have a calibrated resistance and modifying the length of the cable is not allowed. For these cables, the surplus length which is not involved in the routing of the cable will also be able to be stored in the storage recess of the fixing baseplate of the equipment item concerned. The level of order and of safe holding of the cables will be the same as if the cable had been cut to measure.

The presence of the connector support makes it possible to adapt the length of the cable without the presence of the equipment item concerned, which remains protected during the operation.

The invention is particularly advantageous for plug-in aeronautical equipment items such as the ARINC 836A standard formats. According to the invention, no conventional plug-in device is necessary, such as fixed chairs which require complex connections, control of the functional plays between a housing and its support, and complex and costly locking systems.

The invention in fact allows a simple fixing such as a screw-fixing for the electrical equipment housings.

The invention is applicable to any type of cable (electrical power supply, data, etc.), whatever its technology.

The fixing baseplate according to the invention can comprise the following additional features, alone or in combination:

the spacer comprises a plurality of blocks separated from one another;

the blocks each comprise a bottom face and a top face, the fixing base being defined by the different bottom faces of the blocks, and the support face being defined by the different top faces of the blocks;

the first lateral opening of the storage recess is disposed between two blocks;

the baseplate comprises at least one protection wall extending between two blocks;

the connector support is secured to a block;

the locking device of the connector support comprises an elastic lug;

the storage recess comprises a second lateral opening disposed on its edge opposite the first lateral opening;

the cable ties are elements that can be snap-fitted onto the fixing baseplate;

the baseplate comprises a bottom wall comprising snap-fitting orifices for the cable ties.

BRIEF DESCRIPTION OF THE FIGURES

Other features and advantages of the invention will emerge from the following nonlimiting description, with reference to the attached drawings in which.

DETAILED DESCRIPTION OF THE INVENTION

Figure 1:
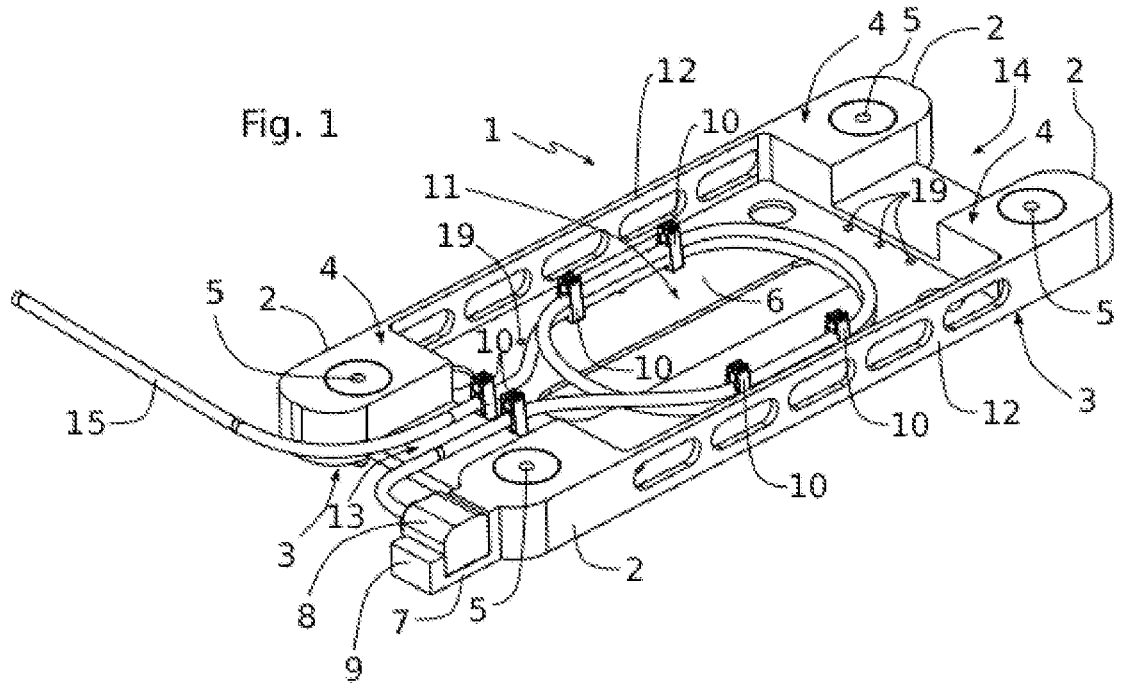
FIG. 1 is a perspective view of a fixing baseplate according to a first embodiment of the invention.

FIG. 1 illustrates an aeronautical electrical equipment item fixing baseplate 1 according to the invention.

The fixing baseplate 1 comprises a spacer which, here, is produced by four fixing blocks 2 defining a fixing base 3 and a support face 4. Each of the blocks 2 comprises the following attachment device:

a top face defining the support face 4;

a bottom face defining the fixing base 3.

The upper part of the fixing blocks 2, visible in FIG. 1, comprises, in the present example, tapped portions 5 allowing the screw fixing of an electrical equipment item placed on the support face 4.

The fixing base 3 also comprises a fixing device such as tapped or threaded portions, allowing the fixing of the fixing baseplate 1 onto a structure of the aircraft.

The fixing baseplate 1 further comprises a bottom wall 6 extending between the blocks 2, in the same plane as the fixing base 3.

A connector support 7 is, moreover, fixed onto one of the blocks 2. The connector support 7 is illustrated in a simplified way in the form of a complementary recess of the connector 8 to be locked, and comprising an elastic lug 9 constituting a device for locking the connector 8, (the elastic lug being able for example to comprise a connector 8 immobilizing tooth).

The fixing baseplate 1 comprises a storage recess 11 disposed between the fixing base 3 and the support face 4. The storage recess 11 is, here, of generally parallelepipedal form and is delimited: laterally by the four blocks 2, at the top level by the plane of the support face 4; and at the bottom level by the plane of the fixing base 3. The storage recess 11 here comprises two holed protection walls 12, each of which extends between two blocks 2.

The fixing baseplate 1 further comprises cable ties 10 disposed in the storage recess and fixed, in the example illustrated, onto the bottom wall 6. The cable ties 10, here, each consist of an elastic clamp suitable for receiving and tightening an electrical cable 15.

The fixing baseplate 1 further comprises a lateral opening 13 allowing the electrical cables to be run between the storage recess 11 and the outside of the fixing baseplate 1. In the example illustrated, the fixing baseplate 1 further comprises a second lateral opening 14 situated on the opposite edge of the fixing baseplate 1. FIG. 1 illustrates a fixing baseplate 1 as it appears when it is fixed onto a structural element of the aircraft and when an interconnection cable 15 forming part of the network of the aircraft is installed in the fixing baseplate 1. The cable 15 enters into the fixing baseplate 1 through the first lateral opening 13 and is held in position by a first cable tie 10 located at this lateral opening 13 such that the cable 15 is immobilized as soon as it enters into the fixing baseplate 1.

The cable 15 is then coiled in the cable ties 10 distributed in the storage recess 11, that is to say that the cable 15 is disposed in windings in the storage recess 11 with the help of the ties 10. These windings are illustrated here in a simplified manner in an oval form, but can, as a variant, have any suitable form. The run of the cable 15 leads its other end out of the fixing baseplate 1 also through the first lateral opening 13 and the cable 15 is locked at this point by a last cable tie 10, still at the first lateral opening 13.

The end of the cable 15 comprises a connector 8 which is put in place and locked in the connector support 7.

An aircraft or a portion of aircraft can thus be mounted and cabled with all or part of its electrical infrastructure, but without the electrical equipment items in place. The wired interconnection links can then be checked. This subassembly can further be transported to other production sites in total safety both for the wiring and for the connectors.

Figure 2:
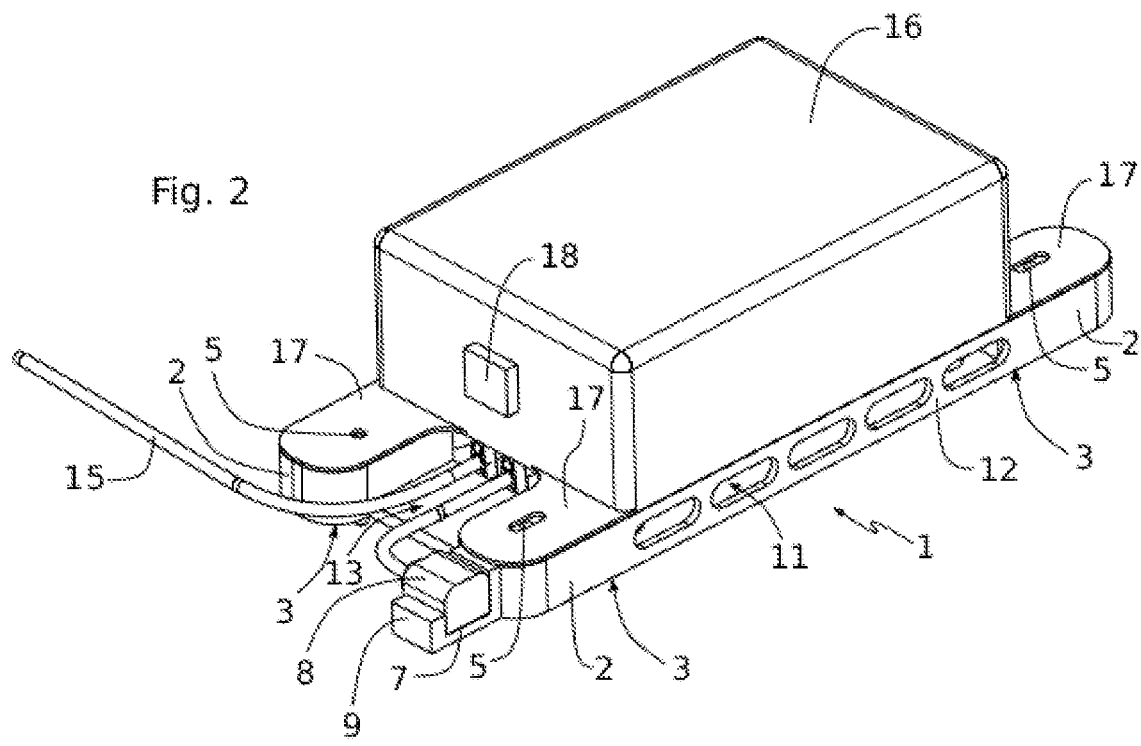
FIG. 2 represents the fixing baseplate of FIG. 1 on which an electrical equipment item is mounted.

FIG. 2 illustrates a next step in the wiring of the aircraft, during which an electrical equipment item 16 is positioned on the fixing baseplate 1. The electrical equipment item 16 is, in the present example, fixed by four screws (not represented) screwed into the tapped portions 5 and immobilizing four fixing lugs 17 of the equipment 16 against the blocks 2.

The final configuration of the wired circuit concerned, in the aircraft, is thus obtained, even though the connector 8 is not connected. Although the wired installation is thus set and cannot suffer any damage, checks and tests are still possible on the connectors 8, 18 which remain accessible.

Figure 3:
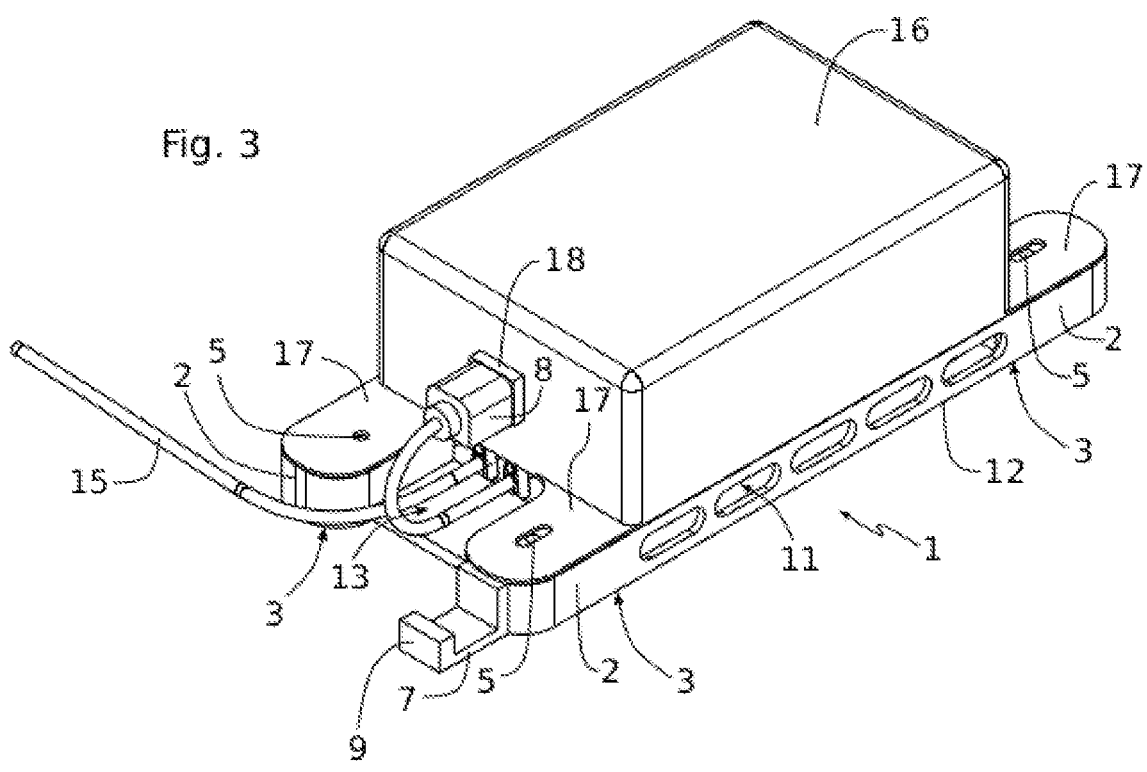
FIG. 3 illustrates the mounting of FIG. 2, the electrical equipment item being connected by its connector.

FIG. 3 illustrates the next mounting or reconfiguration step in which the connector 8 is plugged into the complementary connector 18, after having been detached from the connector support 7. The interconnection architecture is thus operational, in its final operating configuration.

In the case of a reconfiguration with modification of the position of the fixing baseplate 1, the windings of the cable 15 on the cable ties 10 are modified, by adding or removing windings, so as to reduce or increase the length of the cable 15. The position of the fixing baseplate 1 can thus be modified, while keeping the connector 8 protected in the connector support 7.

Figure 4:
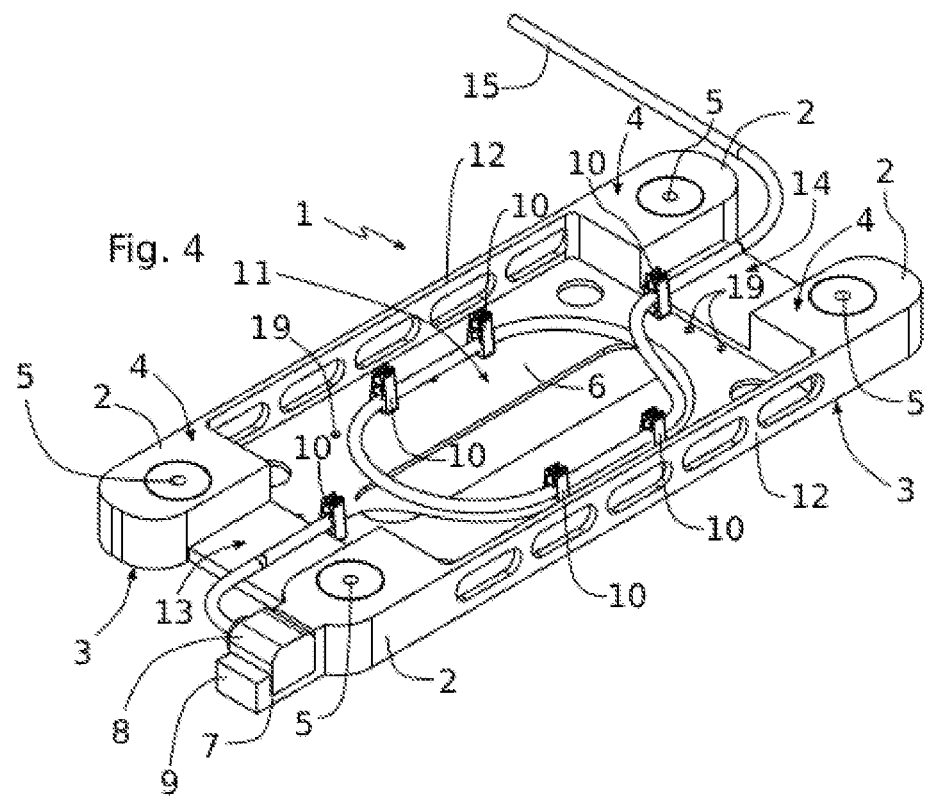
FIG. 4 illustrates a variant arrangement of the fixing baseplate of FIG. 1.

FIG. 4 illustrates a variant of FIG. 1 in which the cable 15 now enters into the fixing baseplate 1 through the second lateral opening 14. This is, for example, a case in which, during initial assembly or upon reconfiguration, the run of the cable 15 makes its entry into the fixing baseplate 1 through this second lateral opening 14 more suitable. The fixing baseplate 1 can be provided with as many lateral openings as necessary, depending on the degree of adaptation desired for the fixing baseplate 1.

In a particularly advantageous embodiment, the fixing baseplate 1 is produced in a single piece: the fixing blocks 2, the bottom wall 6, the connector support 7, and the protection walls 12 can be produced together, for example by molding.

The modularity of the fixing baseplate 1 can be improved by cable ties 10 produced by elements that can be snap-fitted into orifices 19 of the bottom wall 6. Thus, between the configuration of FIG. 1 and the configuration of FIG. 4, the cable tie 10 which holds the cable 15 at the entry of the fixing baseplate 1 has simply been moved.

Figure 5:
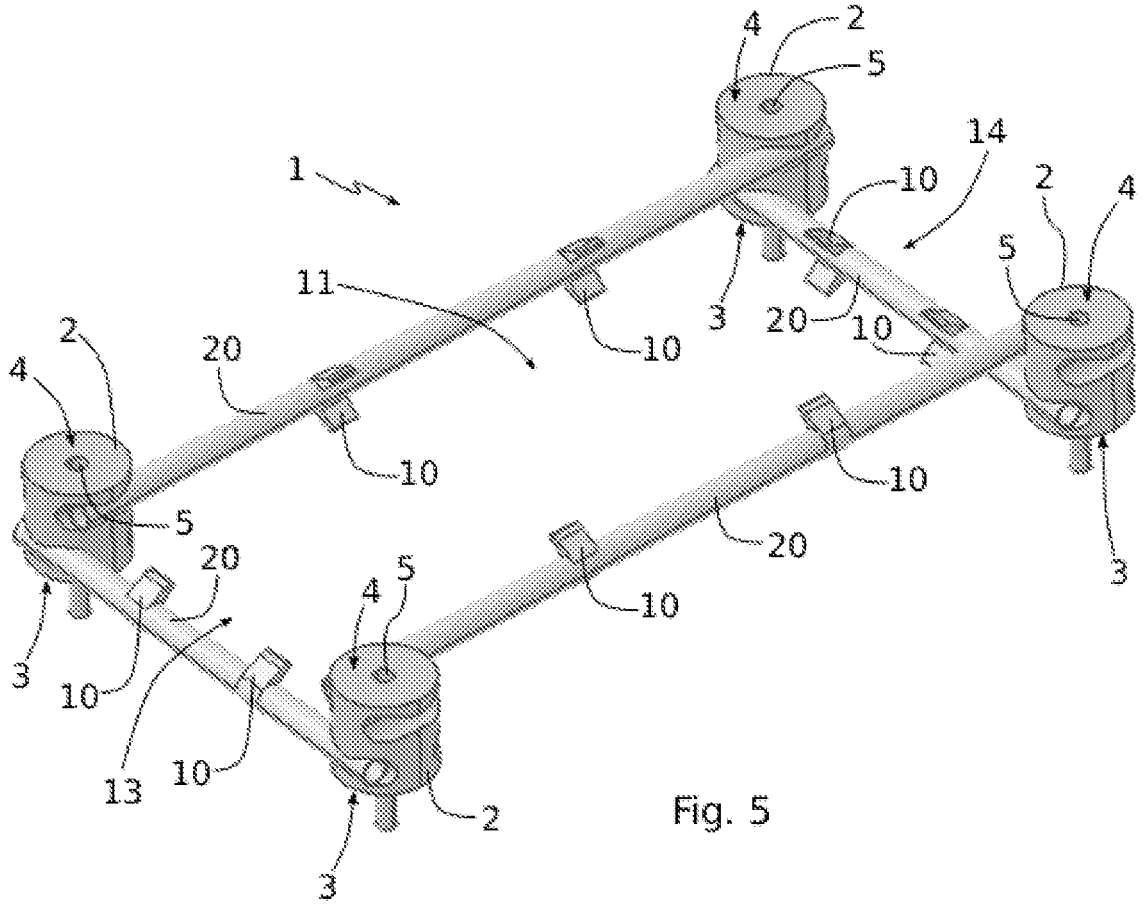
FIG. 5 illustrates a fixing baseplate according to a second embodiment of the invention.

FIG. 5 illustrates a second embodiment of the fixing baseplate 1 which has an inexpensive structure made from simple mechanical elements. The elements that are similar to the first embodiment bear the same reference numbers in the figures.

The fixing baseplate 1 here comprises a storage recess 11 which is defined between four structural bars 20 which are rigidly fitted into four blocks 2. The blocks 2 have a generally cylindrical form and each have a top face delimiting the support face 4, and a bottom face delimiting the fixing base 3.

The connector support (not represented) can be secured to any one of the four blocks 2.

The blocks 2 comprise a tapped portion 5 on their upper part and comprise another threaded portion on their lower part for their fixing onto a structural portion of the aircraft.

The cable ties 10 are, here, secured to the structural bars 20 and are adapted to hold the winding of a cable between the four structural bars 20.

Variant embodiments can be envisaged. For example, the fixing baseplate 1 can be linked directly to the housing of the electrical equipment item. The cable ties can then be secured to a bottom wall of the housing of the electrical equipment item, while fixing rails disposed on either side of these cable ties define the storage recess.

Moreover, the fixing base and the support face are not necessarily flat and can be adapted to a housing whose bottom is not flat and to a non-flat fixing zone on the aircraft.

The invention claimed is:

1. An aeronautical electrical equipment fixing baseplate (1) comprising:

a spacer comprising first attachment device defining a fixing base (3), and second attachment device defining a support face (4) for holding electrical equipment (16);

a storage recess (11), disposed between the fixing base (3) and the support base (4) of the spacer, the storage recess comprising a first lateral opening (13);

cable ties (10), disposed in the storage recess (11), and suitable for holding a winding of cable; wherein the cable ties enable adjusting the length of the cable (15) by modifying the number of windings, allowing repositioning of the baseplate (1) within the aircraft structure without disconnecting the cable (15); and a connector support (7), disposed opposite the first lateral opening (13) and provided with a connector locking device (9), the connector locking device being suitable for maintaining a connector (8) secured in the connector support (7) in the absence of the electrical equipment item (16);

wherein the fixing baseplate (1) is configured to be mounted on the structure of an aircraft and transported with the cable (15) and connector (8) secured in place, prior to installation of the electrical equipment item (16).

2. The fixing baseplate as claimed in claim 1, wherein the spacer comprises a plurality of blocks (2) separated from one another.

3. The fixing baseplate as claimed in claim 2, wherein each blocks (2) comprises a bottom face and a top face, the fixing base (3) being defined by the bottom faces of the blocks (2), and the support face (4) being defined by the top faces of the blocks (2).

4. The fixing baseplate as claimed in claim 2, wherein the first lateral opening (13) is disposed between two blocks (2).

5. The fixing baseplate as claimed in claim 2, further comprising at least one protection wall (12) extending between two blocks (2).

6. The fixing baseplate as claimed in claim 2, wherein the connector support (7) is secured to one of the blocks (2).

7. The fixing baseplate as claimed in claim 1, wherein the locking device (9) comprises an elastic lug.

8. The fixing baseplate as claimed in claim 1, wherein the storage recess (11) comprises a second lateral opening (14) disposed on an edge opposite the first lateral opening (13).

9. The fixing baseplate as claimed in claim 1, wherein the cable ties (10) are snap-fitted elements.

10. The fixing baseplate as claimed in claim 9, further comprising a bottom wall (6) comprising snap-fitting orifices (19) for the cable ties (10).

11. An aircraft comprising a wired interconnection network and electrical equipment items (16) connected to the wired interconnection network, wherein at least one item of electrical equipment devices (16) is mounted on a fixing baseplate (1) according to claim 1, the electrical equipment item (16) being connected to the wired interconnection network by a cable (15), a portion of which is coiled in the storage recess (11); and wherein the connector (8) is maintained in place by the connector support (7) during transport prior to final assembly.

12. A method for configuring the physical architecture of the wired interconnection network of an aircraft, the method comprising the following steps:

mounting on the structure of the aircraft, at least one fixing baseplate (1) according to claim 1;

installing a cable (15), a portion of which is coiled in the storage recess (11);

locking a connector (8) onto the connector support (7);

transporting the aircraft structure with the baseplate (1), cable (15), and connector (8) secured;

mounting an electrical equipment device (16) on the fixing baseplate (1) and connecting the connector (8) thereof.

13. The method as claimed in claim 12, further comprising checking conformity of the wired interconnection network prior to mounting the electrical equipment item (16).

14. The method as claimed in claim 12, further comprising the following steps:

removing the electrical equipment device (16) from the fixing baseplate (1);

repositioning the fixing baseplate (1) within the aircraft structure by modifying the number of windings of the cable (15) in the storage recess (11); and reinstalling the electrical equipment item (16) on the repositioned baseplate (1).

\* \* \* \* \*